June 24, 1930.    U. G. TODD    1,766,853
PUMPING APPARATUS
Filed Jan. 18, 1930    2 Sheets-Sheet 1

Fig. 1

INVENTOR
Ulysess G. Todd
BY
Edward H. Cumpston
his ATTORNEY

June 24, 1930.  U. G. TODD  1,766,852

PUMPING APPARATUS

Filed Jan. 18, 1930  2 Sheets-Sheet 2

INVENTOR
Ulysess G. Todd
BY
Edward H. Dumpster
his ATTORNEY

Patented June 24, 1930

1,766,853

UNITED STATES PATENT OFFICE

ULYSESS G. TODD, OF ROCHESTER, NEW YORK, ASSIGNOR TO THE PFAUDLER CO., OF ROCHESTER, NEW YORK, A CORPORATION OF NEW YORK

PUMPING APPARATUS

Application filed January 18, 1930. Serial No. 421,718.

This invention relates to pumping apparatus, and especially to said apparatus for use in extracting liquid from a partially evacuated vessel. The principal object of the invention is to provide a satisfactory pumping apparatus which will operate at comparatively high efficiency in drawing fluid from a partial vacuum.

Another object of the invention is the provision of an improved hookup or piping arrangement for a pumping apparatus so arranged that the apparatus may be operated in different ways at different times, as may be desired.

Still another object is the provision of a pump having a supplementary port to facilitate the flow of liquid into the pump.

To these and other ends the invention resides in certain improvements and combinations of parts, all as will be hereinafter more fully described, the novel features being pointed out in the claims at the end of the specification.

In the drawings:

Fig. 1 is an elevation of an apparatus constructed in accordance with a preferred embodiment of the invention;

Similar reference numerals throughout the several views indicate the same parts.

Figure 2:
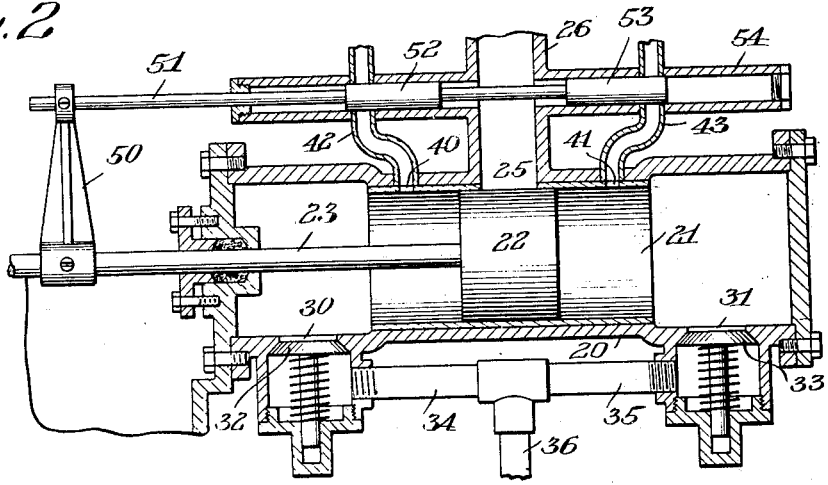
Fig. 2 is a vertical section taken longitudinally along the center of a portion of the pump illustrated in Fig. 1, showing details thereof.

This application is partly a division and partly a continuation of my co-pending application, Serial No. 312,361, filed October 13, 1928, which application, in turn, is a division of my co-pending application, Serial No. 148,719, filed November 16, 1926.

The present invention relates to the withdrawal of liquid from any vessel, but particularly from a partially evacuated vessel such as the vacuum pan 10 illustrated in Fig. 1, in which any liquid or semi-liquid may be processed or treated in any desired manner, the contents of the vessel being heated if desired during the processing by means of heating fluid within the jacket 11. The vessel 10 may be evacuated to any desired degree by means of any suitable source of vacuum such as the eductor 12 connected to the vessel 10 by a conduit 13 provided with a valve 14. The eductor may be of any known type, operated, for instance, by the flow of water downwardly through pipe 15, the construction of the eductor being such as to create a vacuum within the conduit 13, the water and evacuated fluid being discharged through the conduit 16.

There is shown below the vessel 10 a pump 20 for extracting liquid therefrom. This pump preferably comprises a plunger chamber 21 having a plunger 22 reciprocable therein, which plunger is moved by means of a piston rod 23 driven by any suitable means such as the cylinder 24. In the embodiment illustrated, the pump is a double acting one, though obviously a single acting pump may be used if desired. The present double acting pump has an inlet port 25 at an intermediate point in the plunger chamber 21, and a conduit 26 leads upwardly from the inlet port 25 to the bottom of the vessel 10 to supply liquid from the vessel to the inlet.

Discharge ports 30 and 31 are formed in the walls of enlarged portions of the plunger chamber at the ends thereof, which discharge ports are controlled respectively by valves 32 and 33 of known type. After passing the valves 32 and 33, the liquid being discharged flows respectively through conduits 34 and 35 to a common discharge conduit 36 through which it may be conveyed to any desired point.

The parts above described are found to function somewhat unsatisfactorily when it is attempted to withdraw liquid from the vessel 10 while the latter is maintained under vacuum. It is found that the vacuum within the vessel tends to prevent the liquid from running down the conduit 26 to the inlet port 25, and from passing through this port into the plunger chamber. Thus liquid is supplied to the pump at an extremely low rate, with consequent loss of efficiency.

According to the present invention, the pump is provided with a supplementary port for connection to a source of vacuum so that the pressure within the plunger chamber may be reduced preferably to a point as low as, or even lower than, the pressure within the vessel 10. This results in greatly increasing the flow of liquid from the vessel 10 down through the conduit 26 to the inlet port 25, and aids the liquid to enter the plunger chamber through this inlet port. In the present instance, since the pump is a double acting one, two such supplementary ports are used, although if a single acting pump were employed, one such port would obviously be sufficient.

As best shown in Fig. 2, one of the supplementary ports is designated by the numeral 40 and the other by the numeral 41. A conduit 42 leads upwardly from the port 40 and a similar conduit 43 from the port 41. These conduits 42 and 43 are connected to any suitable source of vacuum. In many instances, it is found to be satisfactory to connect these conduits 42 and 43 to the vessel 10 at a point above the liquid level therein. Thus the conduits 42 and 43 are evacuated to the same degree as the vacuum within the vessel 10, and may be said to be connected to a source of vacuum since they are so connected through the vessel and the conduit 13. Valves 44 and 45 are provided in the conduits 42 and 43 respectively, as shown in Fig. 1, so that the connection between these conduits and the vessel 10 may be closed when desired.

When the plunger 22 of the pump moves toward the right hand end of its stroke, for example, and opens the inlet port 25, liquid from the vessel 10 is enabled to flow readily into the plunger chamber 21 notwithstanding the vacuum within the vessel, because of the connection of the plunger chamber to the source of vacuum by means of the port 40 and the conduit 42. Any air within the left hand portion of the plunger chamber which would otherwise obstruct the flow of liquid into the chamber is exhausted through the conduit 42. Thus the chamber fills rapidly with liquid, and the next succeeding leftward movement of the plunger closes the inlet port 25 and forces the liquid through the outlet port 30 and past the valve 32. Such leftward movement likewise opens the port 25 again on the right hand end of the plunger 22, and allows liquid to flow similarly into the right hand portion of the chamber because of the connection thereto of the conduit 43 leading to a source of vacuum. Thus the pump may be operated comparatively rapidly and yet the plunger chamber will fill rapidly with liquid during each intake stroke of the plunger, so that the operation proceeds with comparatively high efficiency.

During the discharge stroke of the plunger, there will obviously be a tendency to force some of the liquid out through the supplementary ports and up through the conduits leading therefrom to the source of vacuum. Hence it is desirable to provide valve mechanism for closing the conduits 42 and 43, preferably automatically, during a portion of the discharge stroke of the plunger, so as to prevent any substantial quantity of liquid being forced up the conduits during the discharge stroke.

This valve mechanism may conveniently be of the form shown in Fig. 2, in which form the piston rod 23 carries an arm 50 to which is connected a valve rod 51 having two valve plugs 52 and 53 movable within a valve cylinder 54. The valve plugs 52 and 53 cooperate with the conduits 42 and 43 respectively, as will be clearly apparent from Fig. 2. When the plunger 22 moves rightwardly from the position shown in Fig. 2, the valve plugs 52 and 53 likewise move rightwardly, which results in opening the conduit 42 leading to the supplementary port 40, although the conduit 43 remains closed. This rightward movement of the plunger is the intake stroke thereof so far as the left hand portion of the plunger chamber is concerned, so that communication between the supplementary port 40 and the source of vacuum connected thereto is established during the intake stroke. This same rightward movement of the plunger constitutes the discharge stroke so far as the right hand portion of the plunger chamber is concerned, and at this time the conduit 43 will be closed by the plug 53, thus operatively closing the port 41 so that no substantial quantity of the liquid is forced through the supplementary port during the discharge stroke and the bulk of the liquid is forced out throught the discharge port 31.

Similarly, when the plunger 22 moves leftwardly again, the valve plug 52 will close the conduit 42 so that the supplementary port 40 is operatively closed during the discharge stroke of the plunger with relation to this end of the pump, while the valve plug 53 will open the conduit 43 to establish communication between the source of vacuum and the supplementary port 41 during the intake stroke of the plunger with respect to this end of the pump. Hence it may be said that the valve mechanism operates automatically in predetermined relation to the movement of the plunger for controlling the supplementary ports 40 and 41.

Figure 3:
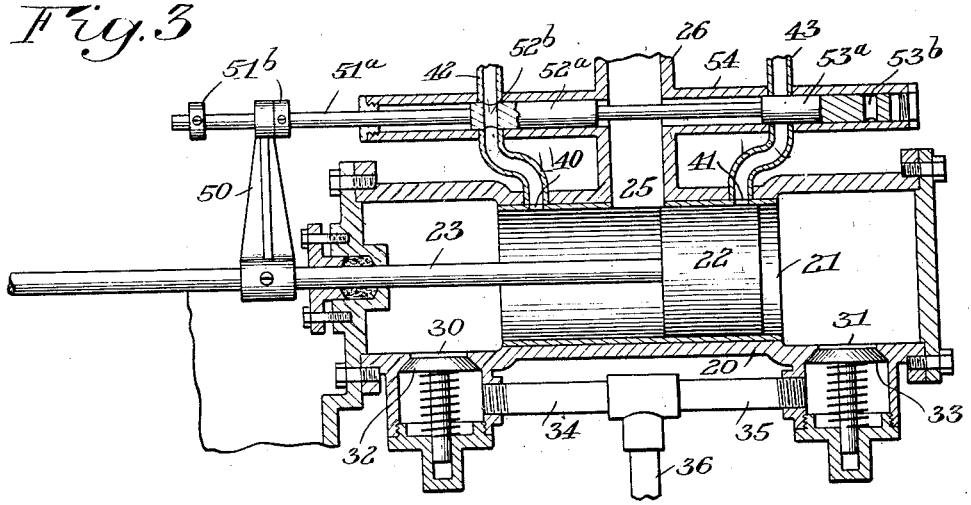
Fig. 3 is a view similar to Fig. 2 of a slightly modified form of pump.

In Fig. 3 there is shown a valve mechanism quite similar to that illustrated in Fig. 2, but different therefrom in some respects. In this instance, the arm 50 is fastened to the piston rod 23 as before, but the valve rod 51ª instead of being fixed to the arm 50 has a limited range of movement relative thereto between collars 51ᵇ. Two valve plugs 52ᵃ and 53ᵃ are employed as before, working within a valve cylinder 54, but each of these plugs instead of being imperforate has a hole 52ᵇ and 53ᵇ respectively. Near the right hand end of the stroke of the plunger 22, as illustrated in Fig. 3, the opening 52ᵇ in the valve plug 52ᵃ comes into alinement with the conduit 42 as shown so that communication is established between the supplementary port 40 and the source of vacuum during a portion of the intake stroke of this end of the pump. Similarly, at the other end of the pump the valve plug 53ᵃ closes the conduit 43 leading to the supplementary port 41 during the discharge stroke of this end.

As the plunger 22 moves leftwardly from the position shown in Fig. 3, the valve rod 51ᵃ remains stationary for a while until the arm 50 comes into contact with the left hand one of the collars 51ᵇ. Continued motion of the plunger then moves the rod 51ᵃ leftwardly so that the valve opening 52ᵇ is carried out of alinement with the conduit 42 and closes this conduit during the discharge stroke of the left hand end of the pump. Likewise the valve plug 53ᵃ is moved to such position that the opening 53ᵇ therein comes into alinement with the conduit 43 and establishes communication between the supplementary port 41 and the source of vacuum during the intake stroke of this end of the pump.

Figure 4:
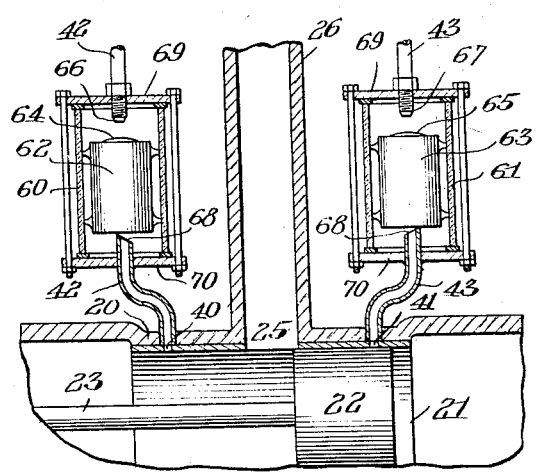
Fig. 4 is a fragmentary similar view illustrating still another modification.

Still another possible form of valve mechanism is shown in Fig. 4. Here, instead of being operated from the piston rod, the valves are of the float variety, operated by the liquid itself. Interposed in each of the conduits 42 and 43 at a point just above the plunger chamber is a float valve of any suitable construction arranged to close the conduit when the liquid rises in the conduit and to open it when the liquid falls. Such float valves may conveniently comprise glass cylinders 60 and 61 respectively in which hollow floats 62 and 63 respectively are mounted, each float having a curved rubber portion 64 and 65 respectively at its top for contact with an open end 66 and 67 respectively of the conduits 42 and 43 respectively. The open ends of the conduits below the float valves are beveled as shown at 68 so that these ends always remain open even when the floats are in their lowermost position. The floats 62 and 63 are suitably guided for rising and falling movement within the glass cylinders 60 and 61, which cylinders form air tight joints with top and bottom plates 69 and 70 secured in air tight manner to the conduits 42 and 43.

In this form of valve mechanism, when the plunger 22 moves leftwardly from the position shown in Fig. 4, as soon as it closes the inlet port 25 the discharge stroke of the left hand end of the plunger chamber commences. During this discharge stroke, the liquid within the left hand end of the chamber is put under compression and consequently rises through the port 40 into the conduit 42. Only a comparatively small amount of liquid is needed, however, to fill the lower portion of the conduit 42 below the float valve and to fill the cylinder 60 of the valve to a sufficient extent so that the float 62 rises to bring the rubber part 64 into contact with the end 66 of the portion of the conduit above the valve, thus closing this conduit and cutting off communication between the port 40 and the source of vacuum, which operatively closes this supplementary port. Hence the liquid within the left hand end of the plunger chamber cannot escape through the supplementary port, and is forced out through the discharge port 30.

This same leftward stroke of the plunger constitutes the intake stroke so far as the right hand end of the plunger chamber is concerned, and the release of pressure in this right hand end allows the liquid within the cylinder 61 to run down into the plunger chamber through the conduit 43 so that the valve float 63 is lowered and communication is established between the supplementary port 41 and the source of vacuum through the conduit 43. Then when the plunger 22 has completed its leftward movement and moves rightwardly again, the valve 63 closes during the discharge stroke of its end of the pump, while the valve 62 opens during the intake stroke of its end. Thus the form of valve mechanism shown in Fig. 4, like that illustrated in Figs. 2 and 3, is automatically operable and may be said to operate in predetermined relation to the movement of the plunger for controlling the supplementary ports 40 and 41.

The operation of the pump and of the valve mechanism associated therewith has been clearly set forth in connection with the foregoing description. In this description, it has been stated that the conduits 42 and 43 were connected to the vessel 10 above the liquid level thereof. With this arrangement, the vacuum within the conduits 42 and 43 could not exceed the vacuum within the vessel 10. At certain times, however, it may be desirable to subject the conduits 42 and 43 to a somewhat higher degree of vacuum than that existing within the vessel 10, and to enable this to be done, there is preferably provided a second source of vacuum such as the eductor 80 which is arranged to create a vacuum in the conduit 81 when water or other operating fluid is forced downwardly through the conduit 82, the water together with the air or gas drawn out of the conduit 81 being discharged through the pipe 83. This conduit 81, controlled by a valve 84, is connected to a short downwardly extending conduit 85 which leads in turn to cross conduits 86 and 87 controlled respectively by valves 88 and 89 and connected respectively to conduits 42 and 43. From the conduit 81 another conduit 90 leads upwardly and enters the vessel 10 near the top thereof, this conduit being controlled by a valve 91.

When it is desired to subject the supplementary ports of the pump to a higher degree of vacuum than that within the vessel 10, the second source of vacuum 80 is set into operation in such manner that it produces a greater degree of vacuum than that within the vessel 10. The valves 44, 45, and 91 are closed, and the valves 84, 88, and 89 are open, so that the conduits 42 and 43 instead of being connected to the same source of vacuum as the vessel 10 are connected to the vacuum source 80. In this way any desired degree of vacuum may be produced within conduits 42 and 43 and impressed upon the supplementary ports 40 and 41 of the pump. As before stated, this degree of vacuum may be greater than that existing within the vessel 10 although obviously a less degree of vacuum may be used if desirable under the circumstances.

At times, it may be necessary to shut down the source of vacuum 12 for repairs or for any other reasons. In such cases, the conduit 90 permits the entire apparatus to be operated from the vacuum source 80. By closing the valve 14 and opening the valve 91, with the vacuum source 80 in operation and with the valves 84, 88, and 89 open, it is obvious that the vacuum source 80 will produce vacuum not only within the conduits 42 and 43 but also within the vessel 10 so that evaporation or other liquid processing may be carried on within this vessel under the desired degree of vacuum.

Likewise, when the vacuum source 12 is shut down and only the vacuum source 80 is operated, it is still possible to produce a higher degree of vacuum within the conduits 42 and 43 than that produced within the vessel 10. This may be done by opening the valves 88, 89, and 84 fully, while the valve 91 is open only partially, the amount of opening of the valve 91 being adjusted to produce the desired amount of vacuum within the vessel 10 of less degree than the vacuum existing within the conduits 81, 42, and 43.

It will be seen from the foregoing description that the present invention provides not only a pumping apparatus of satisfactory form which will operate at relatively high efficiency in withdrawing liquid from a partially evacuated vessel, but also provides a comparatively flexible hookup or piping arrangement permitting the apparatus to be used in different ways at different times. For example, both vacuum sources may be used together or either one may be used alone. Such flexibility of operation is of great advantage where continuous production is desired, since it permits certain parts of the apparatus to be shut down for cleaning or repairs without interfering seriously with production.

While certain embodiments of the invention have been disclosed, it is to be understood that the inventive idea may be carried out in a number of ways. This application is therefore not to be limited to the precise details shown, but is intended to cover all variations and modifications thereof falling within the spirit of the invention or the scope of the appended claims.

I claim as my invention:

1. A pump for extracting liquid from a partially evacuated vessel, said pump comprising a plunger chamber having an inlet port for connection to said vessel, an outlet port, and a supplementary port for connection to a source of vacuum, said inlet port and supplementary port communicating with each other through said plunger chamber, and a plunger movable within said chamber, said supplementary port being on the same side of said plunger as said outlet port.

2. A pump for extracting liquid from a partially evactuated vessel, said pump comprising a plunger chamber having an inlet port for connection to said vessel, an outlet port, and a supplementary port for connection to a source of vacuum, said inlet port and supplementary port communicating with each other through said plunger chamber, and a plunger movable within said chamber, said plunger during one portion of its movement substantially cutting off communication between said inlet port and said supplementary port.

3. A pump for extracting liquid from a partially evacuated vessel, said pump comprising a plunger chamber having an inlet port for connection to said vessel, an outlet port, and a supplementary port for connection to a source of vacuum, said inlet port and supplementary port communicating with each other through said plunger chamber, a plunger movable within said chamber, and automatically operable valve mechanism associated with said supplementary port for operatively closing said port at intervals.

4. Apparatus for extracting liquid from a partially evacuated vessel comprising, in combination, a vessel containing liquid, a pump including a plunger chamber having an inlet port, an outlet port, a supplementary port, and a plunger movable within said chamber, conduit means connecting said inlet port to said vessel, a source of vacuum, and conduit means connecting said supplementary port to said source of vacuum, said supplementary port being connected to said inlet port through said plunger chamber when said plunger is in one position, to tend to draw liquid through said inlet port and into said chamber.

5. Apparatus for extracting liquid from a partially evacuated vessel comprising, in combination, a vessel containing liquid, a pump including a plunger chamber having an inlet port, an outlet port, a supplementary port, and a plunger movable within said chamber, conduit means connecting said inlet port to said vessel, a source of vacuum, and conduit means connecting said supplementary port to said source of vacuum, said supplementary port being connected to said inlet port through said plunger chamber when said plunger is in one position, to tend to draw liquid through said inlet port and into said chamber, said plunger when in another position substantially cutting off communication between said inlet port and said supplementary port.

6. Apparatus for extracting liquid from a partially evacuated vessel comprising, in combination, a vessel containing liquid, a pump comprising a plunger having an intake stroke and a discharge stroke, conduit means connecting said pump to said vessel to supply liquid from the vessel to the pump, a source of vacuum, conduit means connecting said pump to said source of vacuum, and valve mechanism for automatically closing said last named conduit means during a portion of the discharge stroke of said pump plunger.

7. Apparatus for extracting liquid from a partially evacuated vessel comprising, in combination, a vessel containing liquid, a pump comprising a plunger having an intake stroke and a discharge stroke, conduit means connecting said pump to said vessel to supply liquid from the vessel to the pump, a source of vacuum, conduit means connecting said pump to said source of vacuum, and valve mechanism for cutting off communication between said pump and said source of vacuum during a portion of the discharge stroke of said pump plunger and for establishing communication between said pump and said source of vacuum during a portion of the intake stroke of said plunger.

8. A pump for extracting liquid from a partially evacuated vessel, said pump comprising a plunger chamber having an inlet port for connection to said vessel, an outlet port, and a supplementary port for connection to a source of vacuum, a plunger movable within said chamber through an intake stroke and a discharge stroke, and valve mechanism operatively closing said supplementary port during a portion of the discharge stroke of said plunger and operatively opening said supplementary port during a portion of the intake stroke of said plunger, to assist the flow of liquid into said chamber.

9. A pump comprising a liquid chamber having a plunger reciprocating therein and having an inlet port, a discharge port, and a supplementary port for reducing pressure within the liquid chamber to assist flow of liquid thereinto, and valve means operable in predetermined relation to the movement of said plunger for controlling said supplementary port.

10. The combination with a vessel containing liquid, of a source of vacuum, conduit means connecting said source of vacuum to said vessel to produce a partial vacuum therein, a pump for extracting liquid from said vessel when the latter is partially evacuated, said pump having a pump chamber, an inlet port, an outlet port and a supplementary port, said inlet port and supplementary port opening independently of each other into said pump chamber, conduit means connecting said vessel to said inlet port to supply liquid thereto, a second source of vacuum, and conduit means connecting said supplementary port to said second source of vacuum to assist the flow of liquid into said pump.

11. The combination with a vessel containing liquid, of a source of vacuum, conduit means connecting said source of vacuum to said vessel to produce a partial vacuum therein, a pump for extracting liquid from said vessel when the latter is partially evacuated, said pump having a pump chamber, an inlet port, an outlet port, and a supplementary port, said inlet port and supplementary port opening independently of each other into said pump chamber, conduit means connecting said vessel to said inlet port to supply liquid thereto, a second source of vacuum, and conduit means connecting said supplementary port at will to either of said sources of vacuum to assist the flow of liquid into said pump.

12. The combination with a vessel contaning liquid, of two sources of vacuum, conduit means connecting said vessel at will to either of said sources of vacuum to produce a partial vacuum in said vessel, a pump for extracting liquid from said vessel when the latter is partially evacuated, said pump having a pump chamber, an inlet port, an outlet port, and a supplementary port, said inlet port and supplementary port opening independently of each other into said pump chamber, conduit means connecting said vessel to said inlet port to supply liquid thereto, and conduit means connecting said supplementary port to one of said sources of vacuum to assist the flow of liquid into said pump.

13. The combination with a vessel containing liquid, of a pump for extracting liquid from said vessel when the latter is partially evacuated, said pump having a pump chamber, an inlet port, an outlet port, and a supplementary port, said inlet port and supplementary port opening independently of each other into said pump chamber, conduit means connecting said vessel to said inlet port to supply liquid thereto, and means for creating a partial vacuum in said vessel and for subjecting said supplementary port to vacuum of a higher degree than the degree of vacuum within said vessel, to assist the flow of liquid from said vessel into said pump.

ULYSESS G. TODD.